(12) United States Patent
Kim

(10) Patent No.: US 6,352,142 B1
(45) Date of Patent: Mar. 5, 2002

(54) ACTIVE SUSPENSION SYSTEM

(75) Inventor: Hyun-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/474,731

(22) Filed: Dec. 29, 1999

(30) Foreign Application Priority Data

Mar. 22, 1999 (KR) .............................................. 99-9620

(51) Int. Cl.$^7$ ................................................. F16F 9/34
(52) U.S. Cl. ............................... 188/266.2; 280/5.504; 701/37
(58) Field of Search .......................... 188/266.1, 266.2, 188/282.2, 282.4; 267/217, 221, 140.11, 64.26; 280/5.504, 5.505, 5.512, 5.515, 124.157, 124.162; 701/37, 38

(56) References Cited

U.S. PATENT DOCUMENTS

| | | | | |
|---|---|---|---|---|
| 4,678,203 A | * | 7/1987 | Rohner et al. ............ | 280/5.504 |
| 4,787,649 A | * | 11/1988 | Watanabe et al. ......... | 280/5.504 |
| 4,825,370 A | * | 4/1989 | Kurosawa .................... | 701/38 |
| 4,909,535 A | * | 3/1990 | Clark et al. ............... | 280/5.504 |
| 5,015,009 A | * | 5/1991 | Ohyama et al. ..... | 280/5.504 X |
| 5,110,152 A | * | 5/1992 | Jones ....................... | 280/5.504 |
| 5,145,206 A | * | 9/1992 | Williams ................. | 280/5.504 |
| 5,326,129 A | * | 7/1994 | Ohlin et al. ............. | 280/5.504 |
| 6,092,815 A | * | 7/2000 | Rutz et al. ............... | 280/5.505 |

* cited by examiner

*Primary Examiner*—Pam Rodriguez
(74) *Attorney, Agent, or Firm*—Christie, Parker & Hale, LLP

(57) ABSTRACT

An active suspension system for an automotive vehicle includes a mono-tube shock absorber for passively absorbing impact from a wheel, an actuator formed around the mono-tube shock absorber, the actuator acting as a cylinder for a mono-tube shock absorber, a coil spring mounted around the actuator for assisting the mono-tube shock absorber and suspending a vehicle body, a servo amplifier connected to the actuator for adjusting hydraulic pressure, a servo valve connected to the servo amplifier for duty control by selectively activating the actuator, and a on/off valve electrically connected to the servo valve for selectively activating the actuator.

3 Claims, 6 Drawing Sheets

ACTIVE SUSPENSION SYSTEM

BACKGROUND OF THE INVENTION

1. Field of the Invention

The present invention relates to a suspension system, and in particular, to an active suspension system capable of sensitively absorbing vibration generated when a vehicle runs on an uneven road and improving running stability.

2. Description of the Related Art

Many suspension systems commonly in use are classified as passive suspension systems. Passive suspension systems react to shocks, loads, and uneven terrain after the vehicle encounters them. Generally, passive suspension systems include struts, springs and resilient pads, and these systems are limited because they are unable to detect changing conditions and accordingly alter the suspension system before those conditions ultimately affect the ride and performance of the vehicle.

Active suspension systems have been designed to overcome some of the shortcomings associated with passive suspension systems.

FIG. 1 shows a prior art active suspension system. As shown in FIG. 1, the active suspension system includes a hydraulic pump 1 for generating and circulating hydraulic pressure, an oil tank 2 for storing oil, a proportional relief valve 3 connected to the hydraulic pump 1 and oil tank 2 for adjusting hydraulic pressure by releasing surplus oil to the oil tank 2, a manometer 4 for displaying present pressure level, an on/off valve 5 for controlling flow direction of the hydraulic oil, a vibration absorbing tank 6 for absorbing vibration generated when a vehicle runs on uneven road surfaces, a damper 7 operated by hydraulic pressure supplied by the hydraulic pump 1, an accelerometer 8 for sensing a vehicle speed, a coil spring 9, a height sensor 10 for measuring a height of a vehicle body, an amplifier 11 for amplifying signals received from the accelerometer 8 and the height sensor 10, an A/D converter 12 for converting the amplified analog signals into digital signals, a signal controller 13 for processing the signal with an algorithm, a D/A converter 14 for converting the digital signal from the signal controller 13, and an amplifier 15 for adjusting the analog signal received from the A/D converter 14 so as to properly control the on/off valve 5 and the proportional relief valve 3.

In this active suspension system, the oil is fed to the damper 7 through a hydraulic line by the hydraulic pump 1 actuated by the driving force of a motor. The hydraulic flow from the hydraulic pump 1 is monitored by the manometer 4 and if the hydraulic pressure level is higher than an optimal level, the relief valve 3 is opened so as to release the surplus oil to the oil tank 2.

Next, the hydraulic flow is directed to the damper 7 by the on/off valve 5 so as to be fed to the vibration absorbing tank 6 and cylinder chamber of the damper 7. The vibration absorbing tank 6 absorbs minute vibrations generated when the vehicle runs on uneven road.

The accelerometer 8 and the height sensor 10 respectively detect the vehicle speed and the height of the vehicle body and responsively produce electric signals. The amplifier 11 receives the electric signals and amplifies them to a predetermined range, then the A/D converter 12 converts the amplified analog signals into digital signals and sends the same to the controller 13. The controller 13 produces a damper control signal on the basis of the digital signal received from the A/D converter and sends the damper control signal to the D/A converter. The D/A converter 14 converts the damper control signal into a corresponding analog damper control signal. The analog control signal is amplified by the amplifier 15 and is then used for controlling the proportional relief valve 3 and the on/off valve 5.

The above active suspension system considerably improves shock absorbing performance. However, the active suspension system has drawbacks in that a great deal of electric power is consumed for operating the hydraulic mechanism.

To solve the above problem, another active suspension system is provided with an actuator mounted parallel with the shock absorber, and having a spring (See FIG. 2 and FIG. 3). The actuator is initially supplied with a hydraulic pressure of 50bar so as to lift the vehicle body, and in this case, a nitrogen tank absorbs road vibration by pressurizing or depressurizing therein.

However, the above suspension system also has shortcomings in that if the hydraulic mechanism malfunctions, the height of the vehicle body comes down as much as 100 mm. Furthermore, there is a limit to the size the nitrogen tank can be increased to in order to improve the vibration absorbing performance, and openings formed in the nitrogen tank cannot be adjusted such that the absorbing performance remarkably decreases.

SUMMARY OF THE INVENTION

The present invention has been made in an effort to solve the above problems of the prior art.

It is an object of the present invention to provide an active suspension system capable of improving shock and vibration absorbing performance.

It is another object of the present invention to provide an active suspension system capable of reducing electric power consumption as well as increasing ride stability.

To achieve the above objects, an active suspension system for an automotive vehicle of the present invention comprises a mono-tube shock absorber for passively absorbing impact from a wheel, an actuator formed around the mono-tube shock absorber, the actuator acting as a cylinder for the mono-tube shock absorber, a coil spring mounted around the actuator for assisting the mono-tube shock absorber and suspending the vehicle body, a servo amplifier connected to the actuator for adjusting hydraulic pressure, a servo valve connected to the servo amplifier for duty control by selectively activating the actuator, and an on/off valve electrically connected to the servo valve for selectively activating the actuator.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
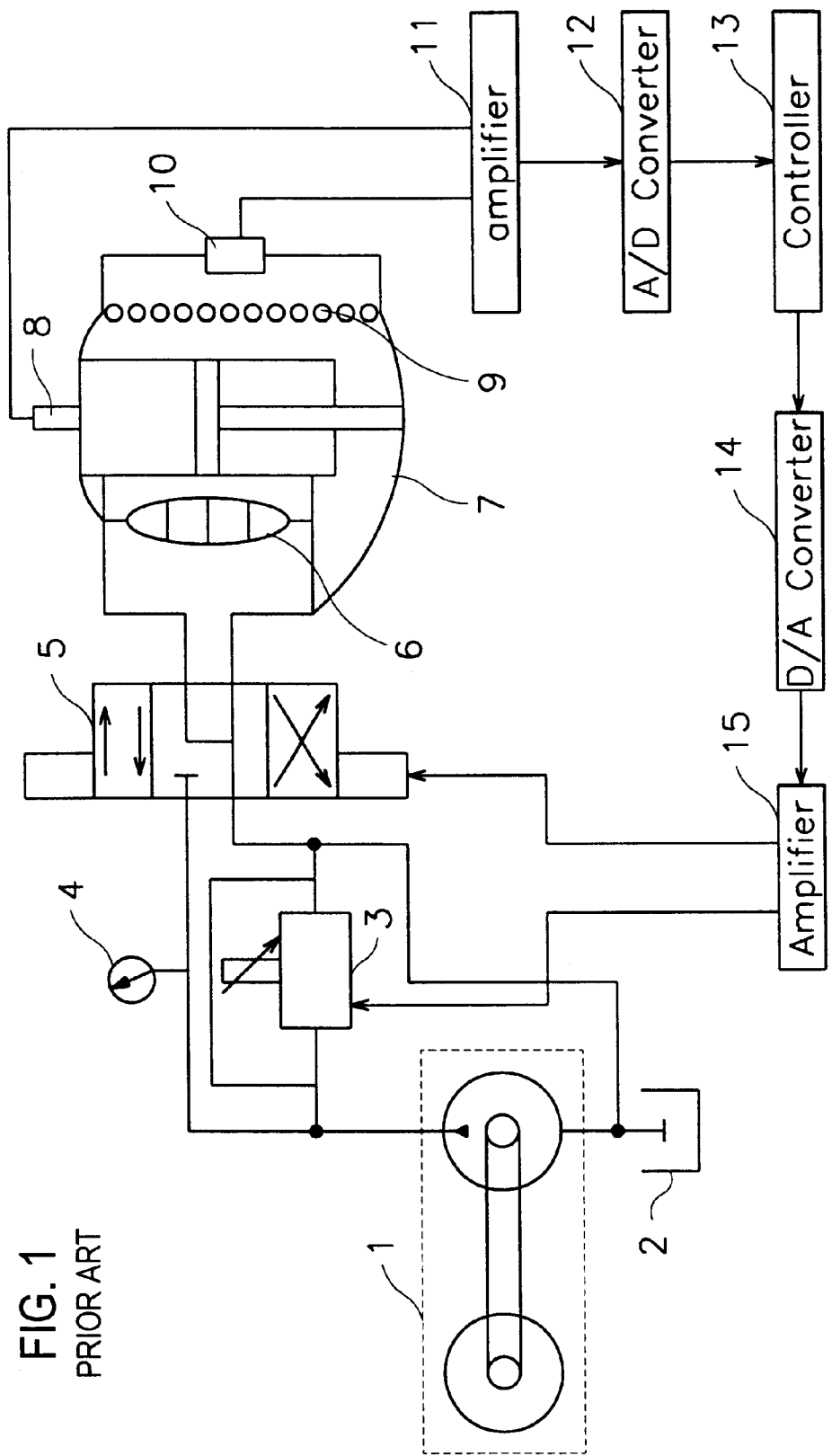
FIG. 1 is a schematic view showing a prior art active suspension system.
Figure 2:
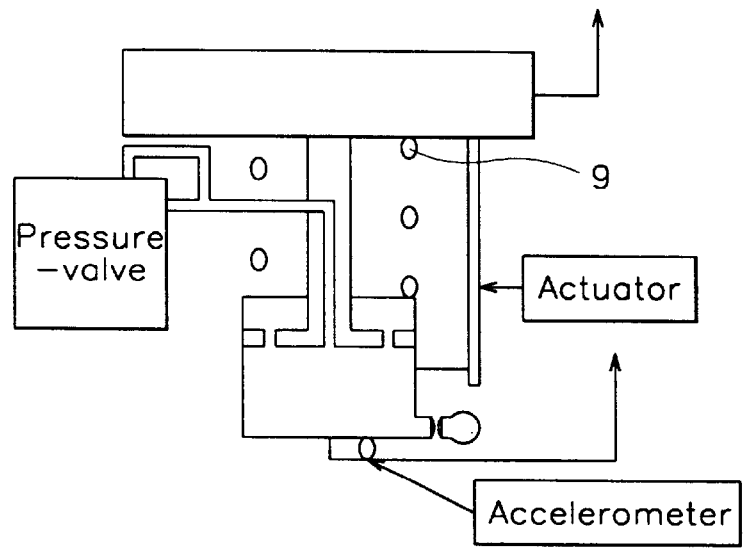
FIG. 2 is a shock absorbing mechanism of another relatively improved active suspension system.
Figure 3:
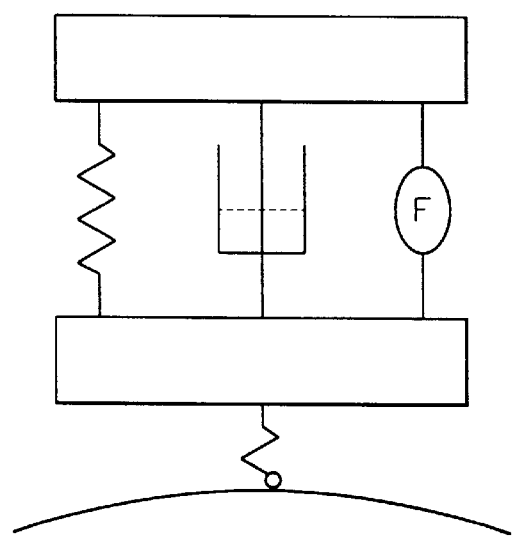
FIG. 3 is an equivalent diagram of the shock absorbing mechanism of FIG. 2.
Figure 4:
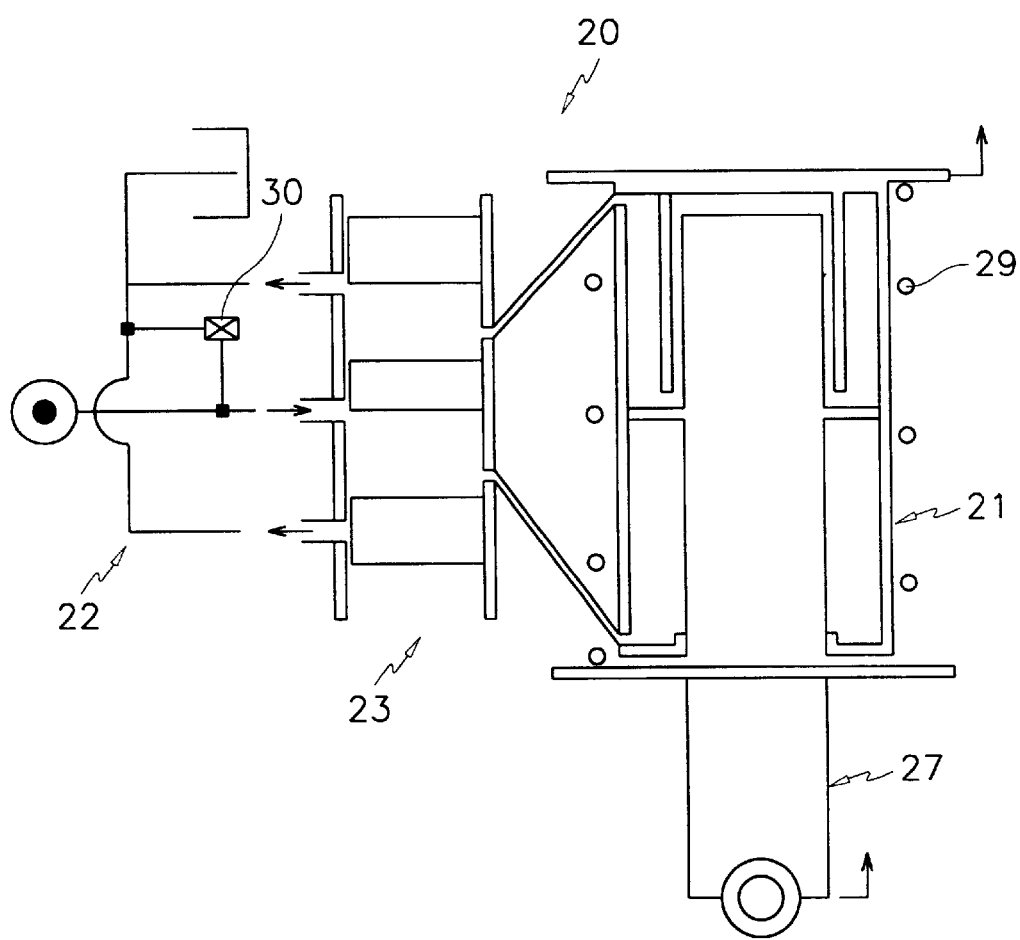
FIG. 4 is a shock absorbing mechanism according to a preferred embodiment of the present invention.

FIG. 4 shows a shock absorbing mechanism 20 of an active suspension system according to a preferred embodiment of the present invention. As shown in FIG. 4, the shock absorbing mechanism 20 comprises an actuator 21 which is connected to a servo valve 22 via a servo amplifier 23 and a mono-tube shock absorber 27 together with a spring 29 therearound that acts as a passive suspension device. The actuator 21 is formed around the mono-tube shock absorber 27 in such a way as to serially operate with the mono-tube shock absorber 27. The servo valve 22 is a solenoid valve that is duty-controlled by an electronic control unit (not shown), and the servo amplifier 23 adjusts the flow amount passing through itself. An on/off valve 30 is connected to the servo valve 22, which stops operation of the actuator 21 by fully opening the servo valve 22.

The operation of the active suspension system of the present invention will be described hereinafter.

In normal state, the actuator 21 acts as an active shock absorbing mechanism and the mono-tube shock absorber 27 and spring 29 act as passive absorbing mechanisms, and they complementarily absorb impacts from uneven road surfaces.

While the active suspension system operates, if the hydraulic mechanism malfunctions, the on/off valve 30 remains on so as to fully open the servo valve 22 such that hydraulic pressure circulates in the actuator 21 and helps the shock absorbing effect of the mono-tube shock absorber 27 and the spring 29.

On the other hand, if an electric mechanism (not shown) for actuating the servo valve 22 malfunctions such that the servo valve 22 is not controllable, the mono-tube shock absorber 27 and the spring 29 absorb impacts from uneven road surfaces.

Figure 5:
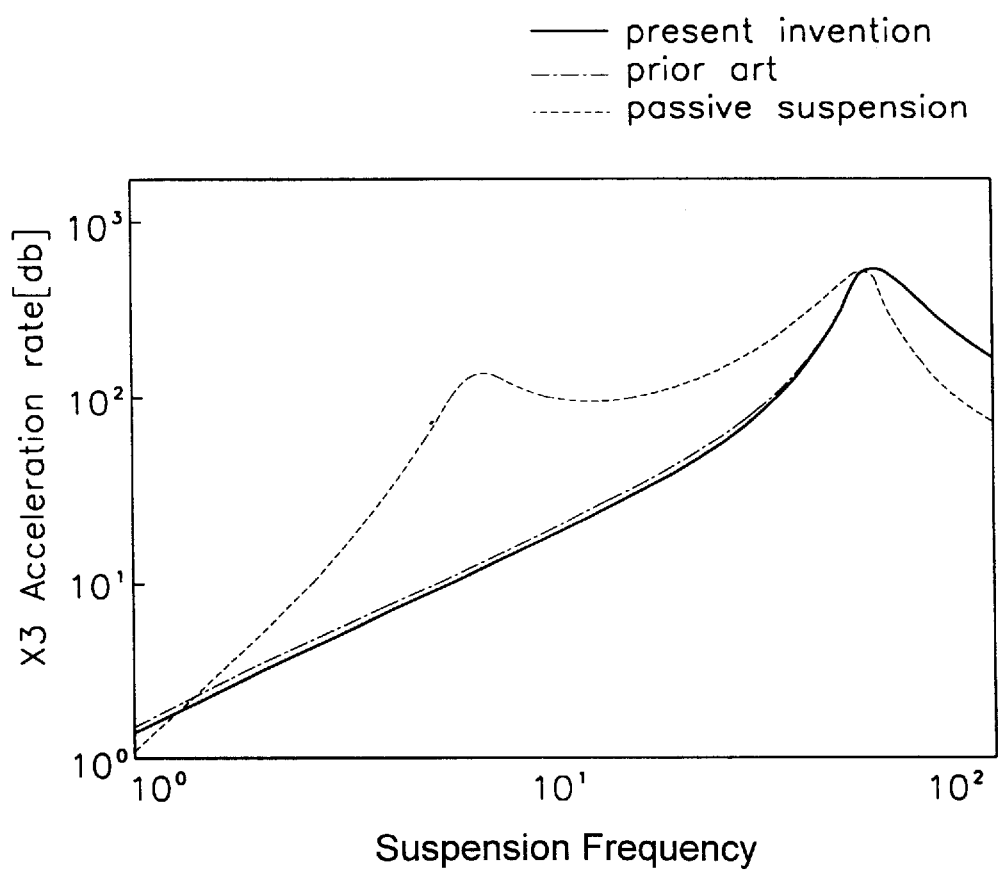
FIG. 5 is a graph showing results of a frequency analysis of a passive suspension system, the prior art active suspension system, and the present active suspension system.

FIG. 5 is a graph showing the results of a frequency analysis of three suspension systems; a passive suspension system, the prior art active suspension system, and the present active suspension system. Test conditions for each system were the same.

As shown in FIG. 5, the vehicle body (X3) acceleration rate verses suspension frequency of the present active suspension system has been reduced at a first resonant range when compared with the prior art active suspension system. At a second resonant range there was no improvement in the frequency buffering effect, but the frequencies at the second resonant range are perceivable.

Figure 6:
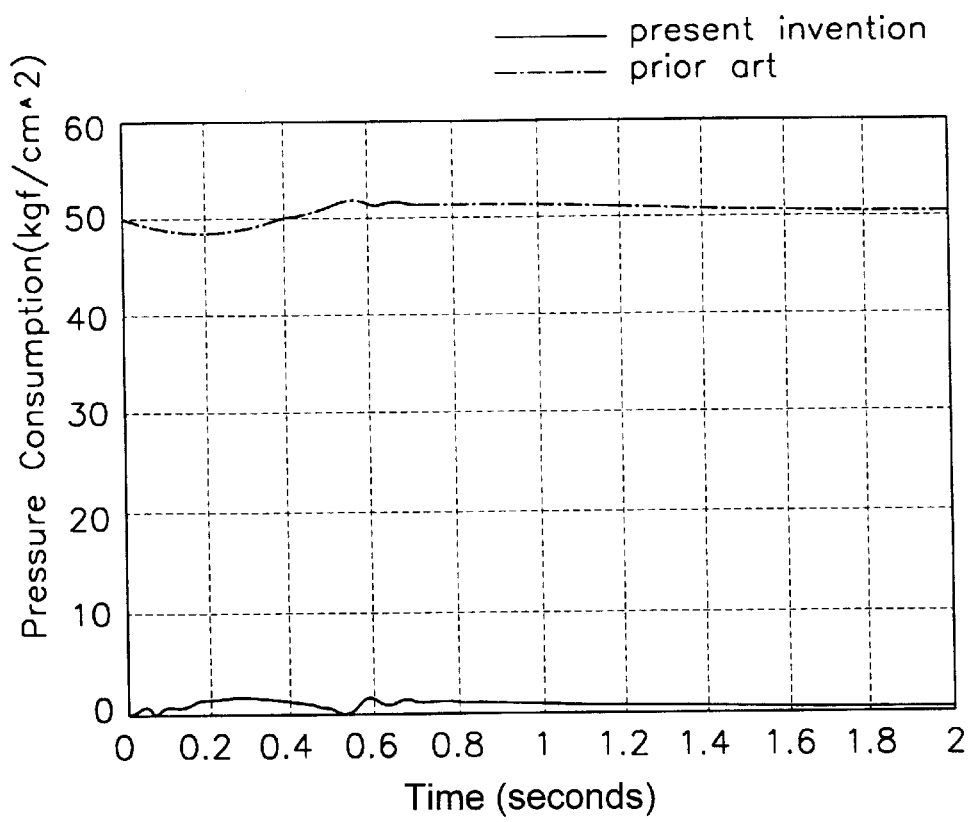
FIG. 6 is a graph showing results of pressure consumption while vehicles equipped with the prior art active suspension system and the present active suspension system pass over a model road having an impediment of 10-cm height and 30-cm width.
Figure 7:
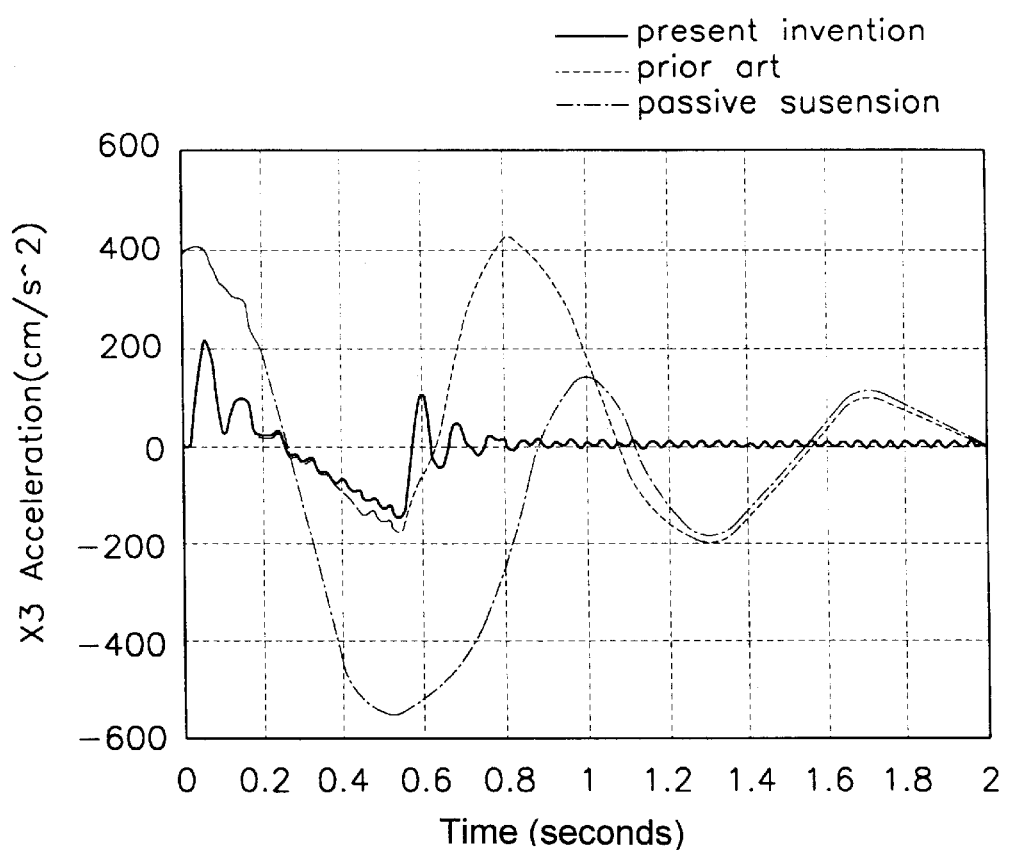
FIG. 7 is a graph showing the results of vehicle body (X3) acceleration rate variations while vehicles equipped with the respective suspension system pass over a model road having impediments of 10-cm height and 30-cm width.

FIG. 6 is a graph showing the results of pressure consumption while two vehicles equipped with the prior art active suspension system and the present active suspension system pass over a model road having an impediment of 10-cm height and 30-cm width. FIG. 7 is a graph showing the result of X3 acceleration rate variations while each vehicle equipped with respective suspension system passes over a model road having an impediment of 10-cm height and 30-cm width.

As shown in FIG. 6, the pressure consumption of the active suspension system of the present invention was dramatically improved and there was no abrupt pressure variation. As shown in FIG. 7, the X3 acceleration was also considerably improved such that there was no abrupt X3 acceleration variation unlike the passive suspension and the prior art active suspension system vehicle cases.

As described above, since the active suspension system according to the preferred embodiment of the present invention is provided with a shock absorber together with a spring and an actuator in serial connection, the spring lifts the vehicle body instead of hydraulic pressure as in the prior art, so that only the energy used for maintaining the present height of the vehicle body is expended and accordingly, the energy consumption decreases. Even if the hydraulic mechanism or electric mechanism for controlling the hydraulic mechanism breaks down, the active suspension system can maintain a relatively good absorbing efficiency. Furthermore, since the passive suspension parts are made out of well-known coil springs and mono-tubes, manufacturing costs are reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An active suspension system for an automotive vehicle comprising:

a mono-tube shock absorber for passively absorbing impact from a wheel;

an actuator formed around the mono-tube shock absorber, the actuator acting as a cylinder for the mono-tube absorber;

a coil spring mounted around the actuator for assisting the mono-tube shock absorber and suspending a vehicle body;

a servo amplifier connected to the actuator for adjusting hydraulic pressure;

a servo valve connected to the servo amplifier for duty control in selectively activating the actuator; and an on/off valve electrically connected to the servo valve for selectively activating the actuator, wherein when the actuator malfunctions the on/off valve is on such that hydraulic fluid circulates in the actuator.

2. An active suspension system of claim 1 wherein the actuator forms a serial connection with the mono-tube shock absorber for enhancing absorbing effect.

3. An active suspension system for an automotive vehicle comprising:

a mono-tube shock absorber for passively absorbing impact from a vehicle wheel;

an actuator coupled to the mono-tube shock absorber;

a coil spring coupled to the actuator and for coupling to the vehicle;

a servo amplifier coupled to the actuator for adjusting pressure within the actuator;

a servo valve connected to the servo amplifier; and an on/off valve coupled to the servo valve for selectively activating the actuator wherein said servo valve remains in a position allowing fluid to flow to the actuator when there is a malfunction in the system.

* * * * *